(12) United States Patent
Ogami et al.

(10) Patent No.: US 6,336,372 B1
(45) Date of Patent: Jan. 8, 2002

(54) VEHICLE TRANSMISSION

(75) Inventors: Shiro Ogami, Kariya; Yoshiki Ito, Aichi-ken, both of (JP)

(73) Assignee: Aisin Ai Co., Ltd., Nishio (JP)

( * ) Notice: Subject to any disclaimer, the term of this patent is extended or adjusted under 35 U.S.C. 154(b) by 0 days.

(21) Appl. No.: 09/425,740

(22) Filed: Oct. 22, 1999

(30) Foreign Application Priority Data

Oct. 30, 1998 (JP) .......................................... 10-310389

(51) Int. Cl.[7] .......................... F16H 61/28; F16H 63/24
(52) U.S. Cl. ................................................... 74/335
(58) Field of Search ............................... 74/335, 473.12

(56) References Cited

U.S. PATENT DOCUMENTS

| | | | | |
|---|---|---|---|---|
| 4,998,443 A | * | 3/1991 | Janiszewski ................. 74/335 |
| 5,233,525 A | * | 8/1993 | Overmann et al. ........... 701/55 |
| 5,706,197 A | * | 1/1998 | Stasik et al. ............... 74/335 X |
| 5,741,202 A | * | 4/1998 | Huber ......................... 477/124 |
| 5,809,835 A | * | 9/1998 | Beim et al. ..................... 74/335 |
| 5,816,100 A | * | 10/1998 | Fowler et al. ................. 74/335 |
| 6,065,560 A | * | 5/2000 | Pameri et al. ......... 74/473.1 X |

\* cited by examiner

Primary Examiner—Sherry Estremsky
Assistant Examiner—Ankur Parekh
(74) Attorney, Agent, or Firm—Burns, Doane, Swecker & Mathis, LLP

(57) ABSTRACT

A vehicle transmission includes a speed change mechanism capable of changing the speed-change ratio in a plurality of shifts, an operating mechanism having a plurality of operating routes for changing the speed-change ratio of the speed change mechanism, an actuator mechanism for driving the operating mechanism, a one-shift handling portion operated to one-shift the speed change mechanism, a one-shift handling portion operated to one-shift the speed change mechanism, a skip-shift handle portion operated to skip-shift the speed change mechanism, and an ECU for controlling the actuator mechanism based on the operation of the one-shift handle portion or the skip-shift handle portion.

3 Claims, 4 Drawing Sheets

VEHICLE TRANSMISSION

BACKGROUND OF THE INVENTION

1. Field of the Invention

This invention relates to a vehicle transmission (speed change apparatus) which comprises a speed change ratio change mechanism (speed change mechanism) which can change a speed-change ratio in n shifts, an operating mechanism for operating the speed change mechanism to one of n shifts, an actuator mechanism for driving the operate mechanism, a handle mechanism to be handled in a shift-up direction or shift-down direction, and an ECU (Electric Control Unit) for controlling the actuator mechanism.

2. Related Art

A vehicle transmission which has a synchromesh-type speed change mechanism or a planetary gear-type speed change mechanism can include an up/down handle portion (for example, an up/down lever) that is handled or shifted in one of the two directions corresponding to an increase/decrease of the speed-change ratio to move the speed-change ratio up or down one shift by one shift or one shift at a time. A conventional vehicle transmission which has the synchromesh-type speed change mechanism and in which the up/down lever is provided is explained below with reference to FIGS. 4 and 5.

As shown in FIG. 4, a vehicle transmission 1 is provided with a speed change casing 2, a switch panel 8 which has an up/down lever 7 to be handled or shifted in one of the two directions corresponding to an increase/decrease of the speed-change ratio, and a ECU 9 which detects a shift of the up/down lever 7 and operates the actuator 6 so that the speed-change ratio is increased or decreased one shift at a time. Provided in the speed-change casing 2 is a gear train 3 for speed-change, a plurality of synchromesh mechanisms 4a to 4c to change (shift) combination of meshed gears of the gear train 3, an operating mechanism 5 which operates or moves the synchromesh mechanisms 4a to 4c to change the speed-change ratio of the gear train 3, and a hydraulic or electrical actuator 6 to drive the operate mechanism 5.

The operating mechanism 5 is comprised of a shift/select shaft 51 shifted in a shift (axial) direction and a select (rotate) direction by the actuator 6, and a predetermined number of shift forks (here, three shift forks 52a to 52c corresponding to five forward shifts and one backward shift) to operate the synchromesh mechanisms 4a to 4c based on a shift/select movement of the shift/select lever 51 by the actuator 6. The shift fork 52b corresponds to a first shift in which a transmitted torque is largest and the degree of reduced rotation is the smallest, and a second shift; the shift fork 52a corresponds to a third shift and a fourth shift; and the shift fork 52c corresponds to a fifth shift in which the transmitted torque is smallest and the degree of reduced rotation is largest, and a backward shift. The shift/select shaft 51 and the shift forks 52a to 52c are connected with each other by a gate member 53. The gate member 53 connects one of three shift forks 52a to 52c with the shift/select shaft 51 by the shift/select movement thereof.

The actuator 6 can be comprised of an electrical motor, hydraulic motor or oil/air cylinder, and a cooperating movement convert mechanism, and can move linearly and rotate the shift/select shift 51 or can move linearly and slide the shift/select shaft 51.

The up/down lever 7 is up-handled (shifted) to increase the speed-change ratio and is down-handled to decrease the speed-change ratio. In order to allow such operation of the up/down lever 7, as shown in FIG. 5, an up (speed increase)-groove 81 which extends in a speed increase direction, and a down (speed decrease)-groove 82 which extends in a speed decrease direction are formed on an operating panel 8. The up/down lever 7 can be also operated to a neutral position and a backward movement position and so a lateral groove 83 which extends from an intermediate position between the up-groove 81 and the down-groove 82 to the neutral position, and a backward movement groove 84 which extends from the lateral groove 83 in parallel with the up-groove 81 are also formed.

In the above vehicle transmission, when the up/down lever 7 is shifted into the up-groove 81 during starting of the vehicle for example, the ECU 9 detecting this shift selects the shift fork 52b for the 1st shift or the 2nd shift and sends to the actuator 6 a command to shift the gear train 3 to a side of an input shaft A. The actuator 6 rotates the shift/select shaft 51 to connect it with the shift fork 52b via the gate member 53, and then it moves the shift/select shaft 51 to the side of the input shaft A. Thus, the shift fork 52b is moved to the same side so that the synchromesh mechanism 4b is operated by a fork 54b provided at a tip end of the shift fork 52b to change the gear train 3 to the 2nd shift.

On the other hand, when the up/down lever 7 is shifted into the down-groove 82, the ECU 9 detected this shift selects the shift fork 52b and sends to the actuator 6 a command to shift the shift fork 52b to a side of an output shaft B. Thus, the synchromesh mechanism 4b and the gear train 3 are shifted to the 1st shift.

In the above vehicle transmission, while the vehicle is running in the 3rd shift, if the up/down lever 7 is shifted into the up-groove 81, the transmission is changed up to the 4th shift by operation of the shift/select shaft 51, the gate member 53 and the shift fork 52a. If the up/down lever 7 is shifted into the down-groove 82, the transmission is changed to the 2nd shift by operation of the shift/select shaft 51, the gate member 53 and the shift fork 52b. This speed increase or speed decrease one shift by one shift is carried out by every shift of the up/down lever 7 into the up-groove 81 or the down-groove 82, or by leaving the up/down lever 7 in the up-groove 81 or in the down-groove 82.

During vehicle driving, there are situations where a driver wishes to change the 5th shift to the 3rd shift or to the 2nd shift at a stroke when the vehicle is running on an ascending road for example, or to change the 3rd shift to the 5th shift when the vehicle is running on a descending road (such shift is called "skip-shift" hereinafter). In the conventional vehicle transmission, the speed-change can be carried out only one shift by one shift, so that the driver should shift the up/down lever 7 into the up-groove 81 or the down groove 82 twice or thrice for the skip shift. Such shift however needs a long time for the speed-change operation, and delays the speed increase/decrease response of the vehicle, which does not satisfy the driver's requirement.

SUMMARY OF THE INVENTION

The present invention is made in view of the above circumstances and intends to provide the vehicle transmission in which the vehicle speed can be changed by a one shift or a skip shift selectively based on the intention and shift operation of the driver. Here, "one-shift" means the vehicle speed is changed from the x-th shift to the (x+1)th shift or to the (x−1)th shift, in a vehicle transmission having the speed change mechanism to be changed in n shifts including m forward shifts and (n−m) backward shifts. Also, "skip-shift" means the vehicle speed is changed from the x-th shift to the (x+2)th or more shifts or to the (x−2)th or lesser shift (here, the relationship 3≦x≦(m−2) is satisfied).

In order to achieve the above object, the vehicle transmission according to the present invention is comprised of a speed change mechanism capable of changing the speed-change ratio in n shifts; an operating mechanism having n operating routes to changing the speed-change ratio of the speed change mechanism in one of n shifts via any of n operating routes; an actuator mechanism for driving the operate mechanism; a one-shift handle portion adapted to be handled to one-shift the speed change mechanism; a skip-shift handle portion handled to skip-shift the speed change mechanism; and an ECU for controlling the actuator mechanism based on the handling of the one-shift handle portion or the skip-shift handle portion. Based on control by the ECU, the actuator mechanism drives the operate mechanism via any of n operating routes to change the speed change mechanism one shift by one shift or more than two shift in one stroke, selectively.

According to the above vehicle transmission, when the driver wishes to change the vehicle speed by the skip shift, he or she shifts a skip-shift handle portion prior to or simultaneous with shift of the one-shift handle portion. Based on this shift of the skip-shift handle portion, the ECU having detected the shifted position of the up/down handle portion drives or controls the actuator so that the vehicle speed is skip shifted from the x-th shift to the (x+2)th shift or to the (x−2)th shift. By this way, the speed increase/decrease response of the vehicle transmission on the sloped road can be improved to satisfy the driver's requirement.

The vehicle transmission of the present invention can include the following embodying modes or variation.

The speed change mechanism can be a planetary gear type, or the synchromesh type. When the present invention is applied to the vehicle transmission which has the planetary gear type speed change mechanism, the actuator mechanism drives a brake mechanism or a clutch mechanism which controls a meshing of the planetary gear. The vehicle transmission which has the synchromesh mechanism type speed change mechanism and to which the present invention is applied will be explained in detail in the preferred embodiment.

The number of shifts of the vehicle speed change mechanism is n which comprises m forward shifts and (n−m) backward shifts. At least, the number m for the forward shifts can be selected within the integer equal to or larger than 3, and is preferably 4, 5 or 6.

The speed change mechanism is comprised of n/2 (when the number of shifts n is an even number), or (n+1)/2 (when the numbers of shifts n is odd number) change portions, and each of the speed change portions corresponds to adjust two of the n shifts.

The operating mechanism includes n/2 or (n+1)/2 shiftable operating portions, and one direction movement and another direction movement of each of the operating portions correspond to the adjacent two shifts, respectively. The operating mechanism to operate the vehicle speed change mechanism by one-shift and the operate mechanism to operate the vehicle speed change mechanism by skip-shift can be separately provided, or the same operating mechanism can be commonly used for both of them.

The actuator mechanism includes n/2 or (n+1)/2 actuators, and each of the actuator drives each of the operate portions, respectively. The actuator mechanism for driving the operate mechanism for the one-shift, and the actuator mechanism for driving the operate mechanism for the skip-shift can be separately provided, or the same actuator mechanism can be commonly used for both of them.

The commonly used operate mechanism and the commonly used actuator mechanism can contribute to make the entire vehicle transmission compact. As the actuator mechanism, a hydraulic oil or air cylinder, an oil motor or an electrical motor can be used.

The one-shift handle portion can be a lever or a switch, and the skip-shift handle portion can be a button or a switch. The skip-shift handle portion is preferably disposed on a knob (for example, on an inner side thereof) when the one-shift handle portion is comprised of a lever, or on a predetermined position on a steering wheel, to be handled by the driver seated on the driving seat by his or her intention, but is rarely touched for the speed-change. Here, the inner side of the knob means a side facing the driver, i.e. the side of the thumb of the left hand. Thus, an erroneous handling of the skip-shift handle portion be can avoided.

The skip-shift handle portion is preferably handled prior to or simultaneous with the handling of the one-shift handle portion (if it is handled after the handling of the skip-shift handle portion, the speed increase/decrease response which can satisfy the driver's requirement will not be realized).

PREFERRED EMBODIMENT OF THE INVENTION

Hereinafter, preferred embodiments of the present invention will be explained with reference to attached drawings. It is noted however the present invention is not limited to these embodiments, but can includes various modification or deformation within a sprit of the present invention.

Figure 1:
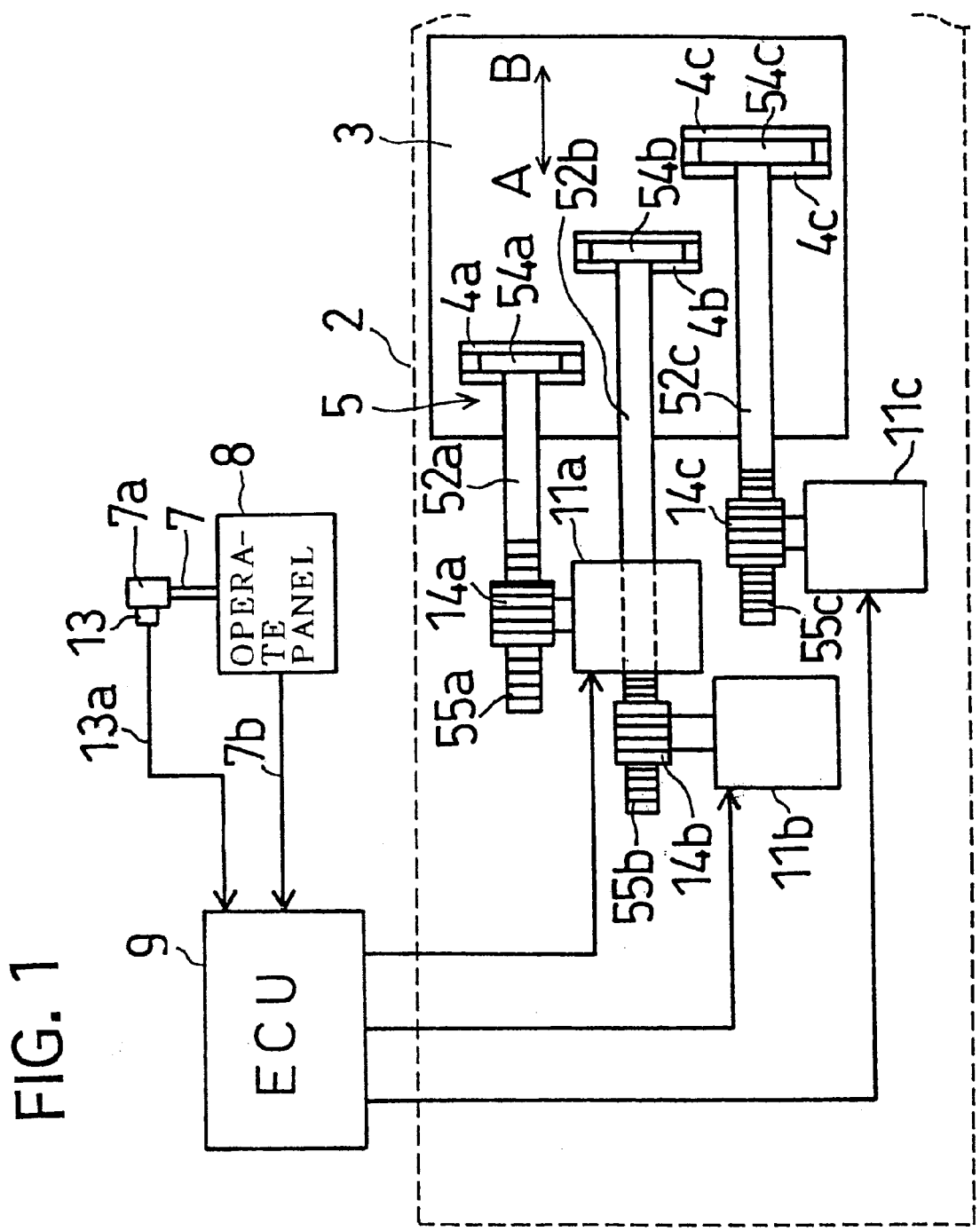
FIG. 1 is a constructive view of a first embodiment of a vehicle transmission according to the present invention.
Figure 4:
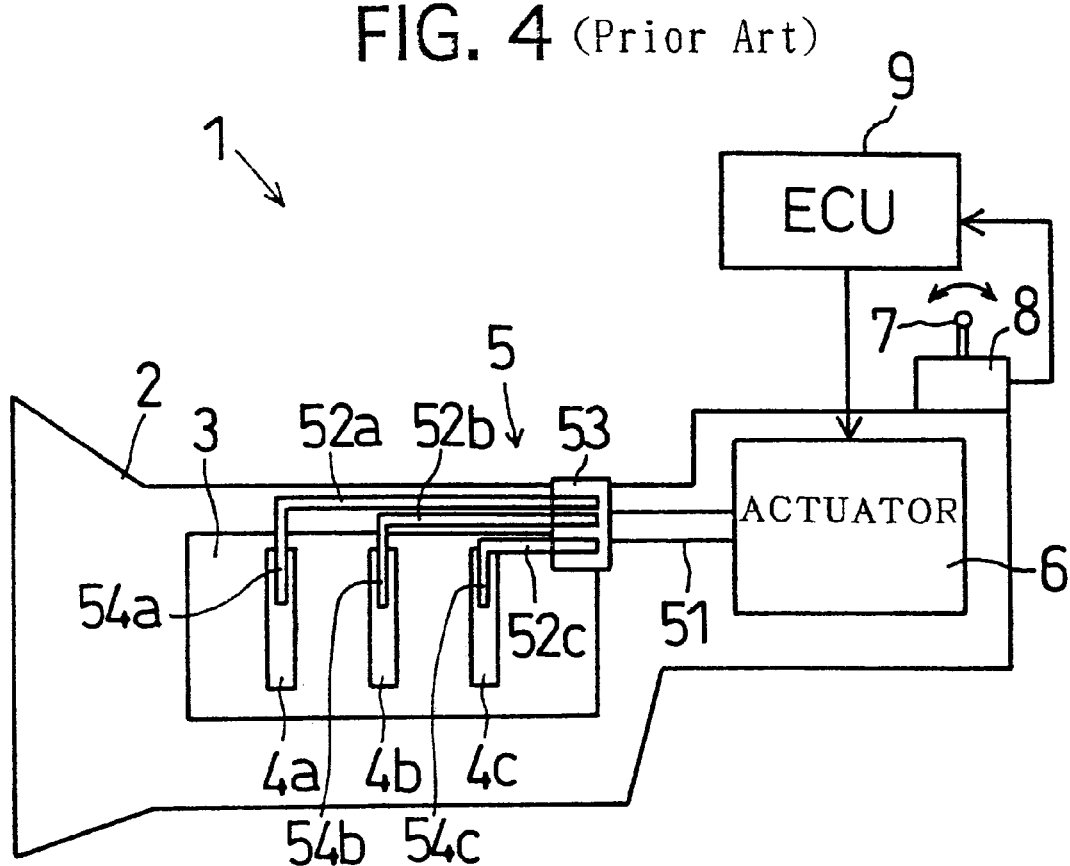
FIG. 4 is a constructive view of a conventional vehicle transmission.
Figure 5:
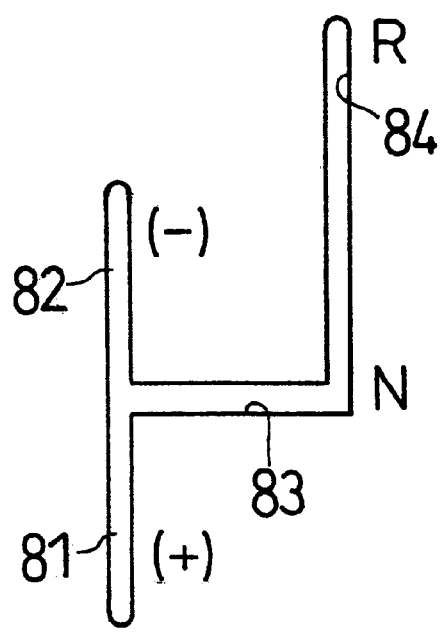
FIG. 5 is an explanatory view for illustrating a shift pattern of a up/down lever of the vehicle transmission of FIG. 4.

FIG. 1 shows the first embodiment of a vehicle transmission which has a synchromesh-type speed change mechanism and to which the present invention is applied. Here, members or elements which have the common function to that of the conventional vehicle transmission shown in FIGS. 4 and 5 (construction of the members or element may be equivalent or different) are identified with the same reference numerals.

The above vehicle transmission includes a transmission body 2, an up/down lever 7 having a button switch 13, and a ECU 9, as main components.

On the transmission body 2 are disposed a gear train for speed-change, three synchromesh mechanisms 4a to 4c for changing a speed-change ratio of the gear train 3, an operating mechanism 5 comprised of three parallel shift forks 52a to 52c of which forks 54a to 54c are engaged with sleeves of the synchromesh mechanism 4a to 4c, and three electrical, reversely rotatable motors (actuator mechanism) 11a to 11c for driving the shift forks 52a to 52c.

The gear train for speed-change 3 is of a conventional type having five forward shifts and one backward shift, and transmits rotation of an input shaft to an output shaft via a counter shaft (all of them are not shown). The synchromesh mechanism 4a changes the gear train 3 to the 3rd shift when a sleeve (not shown) is moved to an output shaft side B, and it changes the gear train 3 to the 4th shift when the sleeve is moved to an input shaft side A. The synchromesh mechanism 4b changes the gear train 3 to the 1st shift when the sleeve is moved to the output shaft side B, and it changes the gear train 3 to the 2nd shift when the sleeve is moved to the input shaft side A. The synchromesh mechanism 4c changes the gear train 3 to the 5th shift when the sleeve is moved to the output shaft side B, and it changes the gear train 3 to the backward shift when the sleeve is moved to the input shaft side A. The synchromesh mechanism 4a to 4c and the operate mechanism 5 constitute the speed change mechanism.

Each of motors 11a to 11c has, on an output shaft thereof, pinions 14a to 14c that mesh with racks 55a to 55c formed on a base end of the corresponding shift forks 52a to 52c. Operation of the motors 11a to 11c is commanded and controlled by the ECU 9.

The up/down lever 7 provided on the handle panel 8 is shifted into the up-groove 81 (refer to FIG. 5) extending in the speed increase direction or into the down-groove 82 extending in the speed decrease direction, and transmits a signal 7b to the ECU 9 corresponding to shifting of the lever 7. On a knob 7a of the up/down lever 7, a button switch (skip-shift handle portion) 13 is provided. This button switch 13 sends an ON/OFF signal 13a to the ECU 9 corresponding to handling of the button switch 13.

Figure 2:
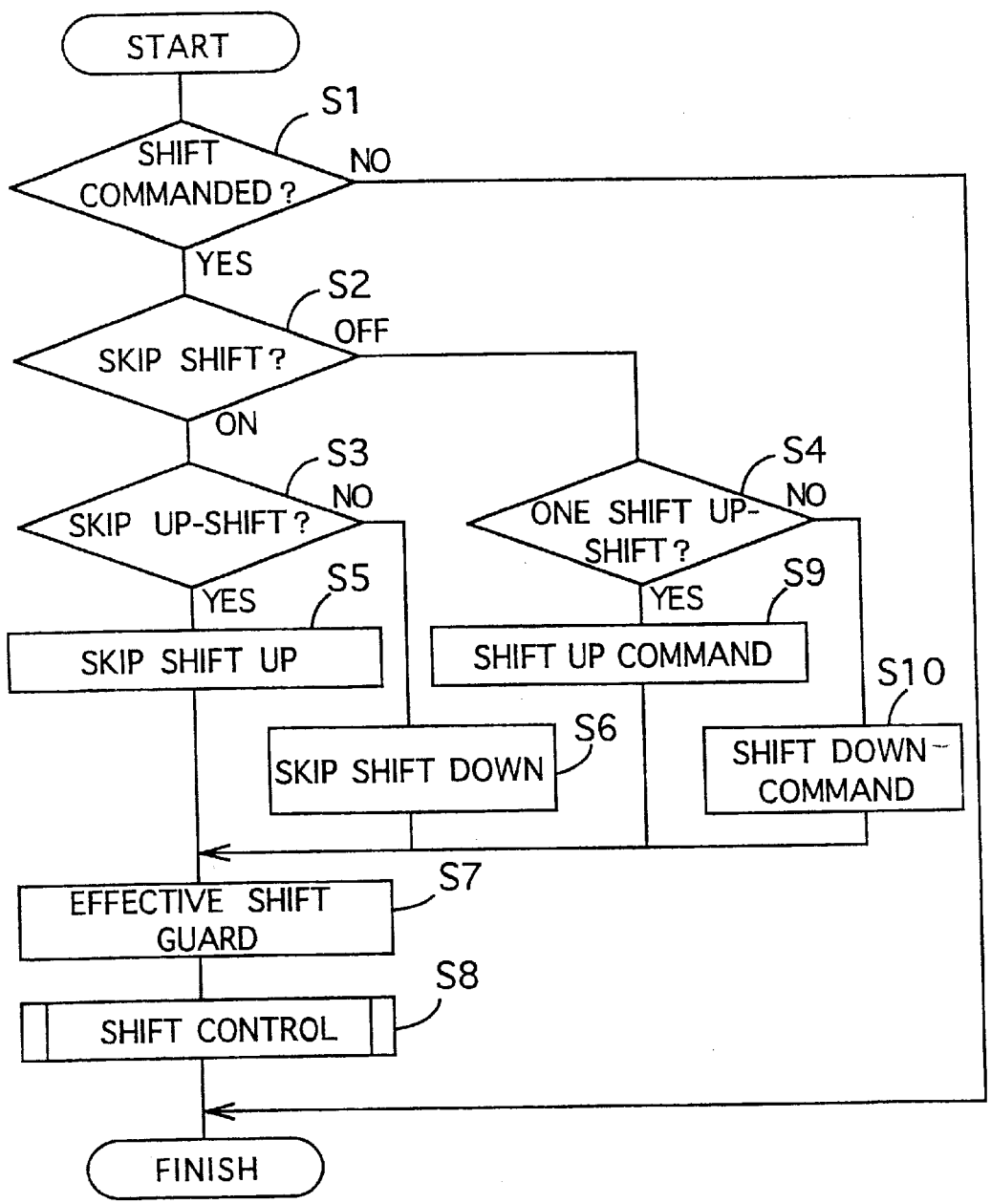
FIG. 2 is a flow-chart for explaining an operation of the first embodiment.

Next, the operation of the vehicle transmission which has above mentioned construction will be explained with reference to the flow-chart shown in FIG. 2.

When the engine is turned on, the ECU 9 carries out, in a step S1, a "shift command" in which the presence/absence of the signal 7b from the up/down lever 7 is detected. While the up/down lever 7 is not handled and the signal 7b is not detected, the sequence completes or repeats the step S1 after another flow. To the contrary, when the up/down lever 7 is shifted into the up-groove 81 for example and the signal 7b corresponding to such shift is detected at step S1, the sequence advances to a step S2. Step S2 ("skip-shift") judges whether or not the button switch 13 is handled, that is the content of the ON/OFF signal 13a (whether the signal 13a is the ON signal or the OFF signal).

When, at step S2, the content of the ON/OFF signal 13a is judged OFF, that is it is determined that the button switch 13 is not handled, the sequence advances to step S4 ("one-shift") to carry out the one-shift. Thenafter, the sequence advances to step S9 ("shift-up command") or to step S10 ("shift-down command"), corresponding to the shifted direction of the up/down lever 7. That is, when the up/down lever 7 is shifted into the up-groove 81, the content of the signal 7a is judged as the up-shift (YES) and one-shift up is commanded in step S9. On the other hand, when the up/down lever 7 is shifted into the down-groove 82, the content of the signal 7a is judged as the down-shift (NO) and one-shift down is commanded in step S10.

To the contrary, when the content of the ON/OFF signal 13a is judged to be ON, that is it is determined that the button switch 13a is handled simultaneous with shift of the up/down lever 7, the sequence advances to step S3 ("skip up shift") to carry out the skip up-shift. At step S3, in the same manner as step S4, the up-shift (Yes) or the down-shift (No) is judged corresponding to the content of the signal 7b based on the shifted position of the up/down lever 7. If Yes is judged at step S3, that is it is determined that the button switch 13 is handled in handling the up/down lever 7 into the up-groove 81, the sequence advances to step S5 ("skip shift-up") to carry out the skip-shift in the up (speed increase) direction. On the other hand, if No is judged at the step S3, that is it is determined that the button switch 13 is handled in handling the up/down lever 7 into the down-groove 82, the sequence advances to step S6 ("skip shift-down") to carry out the skip-shift in the down (speed decrease) direction.

After the judgements of the skip shift-up at step S5 and the skip shift-down at step S6 are made, the sequence advances to step S7 ("effective shift guard") to determine the speed change ratio to which the present speed change ratio can be shifted.

In other words, the step S7 judges possibility of the skip-shift, when the skip-shift is commanded at step S5 or S6. For example, the skip-shift from the 3rd shift up to the 5th shift or down to the 1st shift is possible, but the skip shift down from the 2nd shift or the skip shift up from the 4th shift is impossible. In the latter case, the 2nd shift is changed to the 1st shift, and the 4th shift is changed to the 5th shift respectively, irrespective of the skip-shift command.

The above-described steps S1 to S7 are carried out by the ECU 9.

After the determination of the target speed change ratio, the sequence advances to step S8 ("shift control") so that the ECU 9 sends drive signals to the electrical motors 11a to 11c. For example, when the shift down from the 5th shift to the 3rd shift is commanded by the up/down lever 7 and the button switch 13, the ECU sends the drive signals to the electrical motors 11a and 11c. In the 5th shift, the shift fork 52c holds the sleeve of the synchromesh mechanism 4c at the output shaft side B so the shift fork 52c needs to be shifted by the electrical motor 11c to move the sleeve to the input shaft side A. Also, in the 5th shift, the shift fork 52a holds the sleeve of the synchromesh mechanism 4a at the neutral position so the shift fork 52a needs to be shifted by the electrical motor 11a to move the sleeve to the output shaft side B. Thus, the speed change ratio is shifted or changed from the 5th shift to the 3rd shift.

As another example of skip-shift down, when the shift down command from the 4th shift to the 2nd shift is made by the up/down lever 7 and the button switch 13, the ECU 9 sends the drive signals to the electrical motors 11a and 11b. The electrical motor 11a drives the shift fork 52a to move the sleeve of the synchromesh mechanism 4a from the input shaft side A to the neutral position, and the electrical motor 11b drives the shift fork 52b to move the sleeve of the synchromesh mechanism 4b from the neutral position to the input shaft side A. Further, as an example of the skip-shift up, when the shift up command from the 1st shift to the 3rd shift is made by the lever 7 and the switch 13, the ECU 9 sends the drive signals to the electrical motors 11a and 11b. The electrical motor 11b drives the shift fork 52b to move the sleeve of the synchromesh mechanism 4b from the output shaft side B to the neutral position, and the electrical motor 11a drives the shift fork 52a to move the sleeve of the synchromesh mechanism 4a from the neutral position to the output shaft side B.

In the vehicle transmission of the present invention, three synchromesh mechanisms 4a to 4c, three shift forks 52a to 52c and three electrical motors 11a to 11c are provided, and one and the other directional movements of the synchromesh mechanism 4a to 4c and the shift forks 52a to 52c respectively correspond to the 1st and 2nd shifts, 3rd and 4th shifts, and 5th and backward shifts. Accordingly, the x-th shift and the (x+2)th shift or the (x−2)th shifts, for example the 3rd shift and the 1st shift or the 5th shift, always correspond to the different shift forks 52a to 52c. Accordingly, by handling the button switch 13a, the ECU 9 controls two of the three electrical motors 11a to 11c, to thereby drive two of the three shift forks 52a to 52c. Thus, two of the synchromesh mechanisms 4a to 4c are moved in the input shaft side A or the out put shaft side B to carry out the skip shift. As a result, the vehicle speed is changed quickly corresponding to the driver's requirement, and he or she can drive the vehicle while feeling a good speed increase/decrease responsiveness. In this embodiment, selecting two of the three electrical motors 11a to 11c corresponds to the select operation of the shift forks 52a to 52c.

By the way, when the shift-up command of step S9 or the shift-down command of step 510 is selected based on the one-shift up of step S4, one or two of the three electrical motors 11a to 11c is (are) driven by the command from the ECU 9 to drive one or two of the three shift forks 52a to 52c, to thereby move one or two of the synchromesh mechanisms 4a to 4c. In detail, when the shift up from the 3rd shift to the 4th shift is commanded, the shift fork 52a is driven by the electrical motor 11a to move the sleeve of the synchromesh mechanism 4a from the output shaft B to the input shaft side A. When the shift down from the 3rd shift to the 2nd shift is commanded, the shift fork 52a is driven by the electrical motor 11a to move the sleeve of the synchromesh mechanism 4a from the output shaft side B to the neutral position, and the shift fork 52b is driven by the electrical motor 11b to move the sleeve of the synchromesh mechanism 4b from the neutral position to the input shaft side A.

Figure 3:
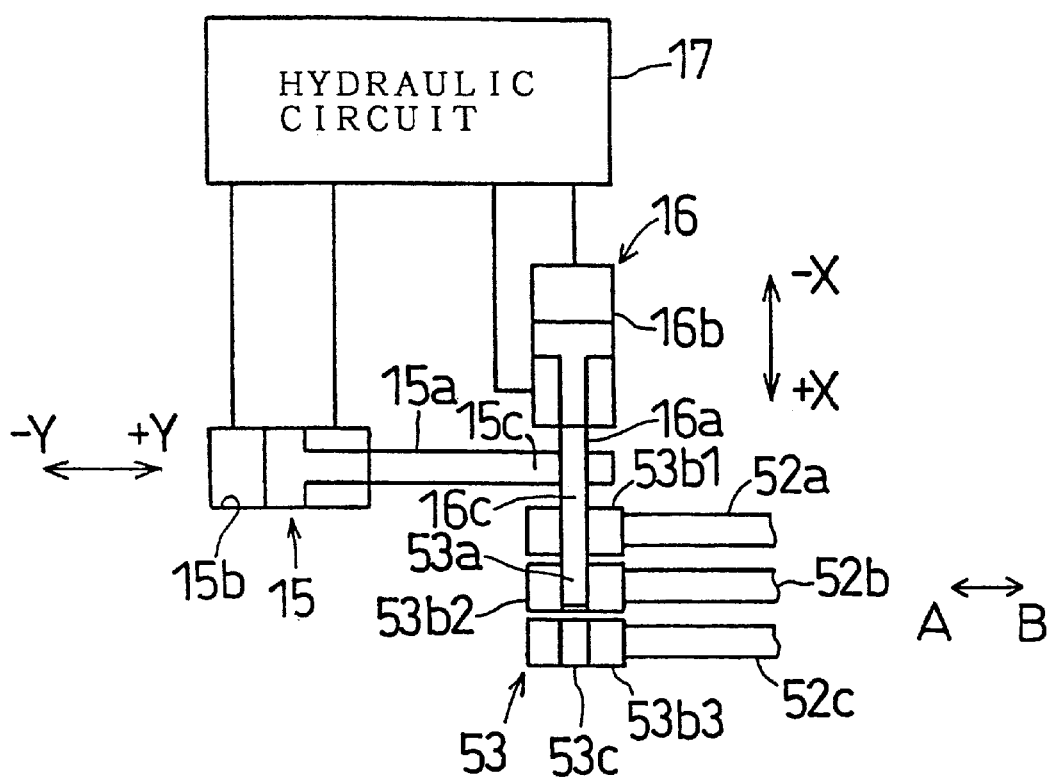
FIG. 3 is a constructive view of the second embodiment (modification of the operate mechanism) of the vehicle transmission of the present invention.

Next, a second embodiment of the present invention relating to a (modification of the operating mechanism 5) will be explained with reference to FIG. 3. This second embodiment differs from the first embodiment in that the operating mechanism 5 is of oil hydraulic type and includes a shift actuator 15 and a select actuator 16.

The shift forks 52a to 52c are driven by a linear-type shift actuator 15 comprised of a piston 15a and a cylinder 15b, and a linear-type select actuator 16 comprised of a piston 16a and a cylinder 16b, with the linear-type select actuator 16 arranged orthogonal to the shift actuator 15. The select actuator 16 moves in the X direction to select an engaging condition between a slider 53a with one of the shift fork 52a to 52c. The shift actuator 15 moves one of the shift forks 52a to 52c which is connected with the slider 53a via the gate member 53 in the Y direction.

The gate member 53 is comprised of the slider 53a which is moved in the −X direction or in the +X direction by the select actuator 16, and connectors 53b1 to 53b3 each having an engage groove 53c in which the slider 53a moves and which corresponds to the shift forks 52a to 52c. The shift shaft 15c of the shift actuator 15 engages the select shaft 16c of the select actuator 16 to move one of the connectors 53b1 to 53b3 to which the slider 53a is connected in the −Y or the +Y direction.

Both the shift actuator 15 and the select actuator 16 are driven by the oil hydraulic circuit 17. The hydraulic circuit 17 has an electromagnetic valve (not shown) for switching the ±X and ±Y directions of the pistons 15a and 16a of the shift actuator 15 and the select actuator 16. The electromagnetic valve is controlled by the ECU 9 (refer to FIG. 1).

The speed-change (shift) by the operate mechanism 5 is carried out in the following manner. In skip-shifting up from the 3rd shift to the 5th shift for example, by handling or operating the button switch 13 simultaneously with handling or operating the up/down lever 7, the shift actuator 15 operates and moves the shift shaft 15a in the −Y direction to shift the shift fork 52a to the input shaft side A to bring it to the neutral position. Also, the select actuator 16 moves the slider 53a by the select shaft 16c to disengage it from the connector 53b1 corresponding to the shift fork 52a and to engage it with the connector 53b3 corresponding to the shift actuator 52c. Thenafter, the shift actuator 15 operates and moves the shift shaft 15c in the +Y direction to move the shift fork 52c in the output shaft side B.

On the other hand, in one-shifting up from the 3rd shift to the 4th shift, the select actuator 16 does not move and maintains the condition where the slider 53a is engaged with the connector 53b1 corresponding to the shift fork 52a, and then the shift shaft 15 moves from the +Y direction to the −Y direction to move the shift fork 52a to the input shaft side A.

In the second embodiment, three shift forks 52a to 52c can be driven by two actuators 15 and 16, which enables the operating mechanism 5 to be made more compact than that of the first embodiment. Although both of the shift actuator 15 and the select actuator 16 are of the linear type, the speed change ratio can be changed by rotation and linear movement, by arranging the connectors 53b1 to 53b2 on a circular and using the oil hydraulic motor as the select actuator 16.

What is claimed is:

1. A vehicle transmission, comprising:

a speed-change-ratio changing mechanism, having three speed changing portions, for changing the speed-change-ratio in six shifts;

an operating mechanism including a first, a second, and a third operating member, each operating member being associated with a respective one of the speed changing portions and having a sleeve engaging its respective speed changing portion each operating member having a neutral position, the first operating member being shifted from its neutral position in a first direction or a second direction to establish a first shift or a second shift respectively, the second operating member being shifted from its neutral position in the first direction or the second direction to establish a third shift or a fourth shift respectively, and the third operating member being shifted from its neutral position in the first direction or the second direction to select a fifth shift or a rearward shift respectively;

an actuator mechanism for driving each of the operating members of said operating mechanism;

a one-shift handling portion operated in one-shifting said speed-change-ratio changing mechanism in an upshift or downshift direction, a skip-shift handling portion operated in skip-shifting said speed-change-ratio changing mechanism in an upshift or downshift direction;

an ECU for controlling said actuator mechanism based on operation of said one-shift handling portion and said skip-shift handling portion, said ECU controlling said actuator mechanism when said skip-shift handling portion is operated in a downshift direction while the second shift is established so that the first operating member is shifted in the first direction passing by its neutral position to establish the first shift, said ECU controlling said actuator mechanism when said skip-shift handling portion is operated to command a skip-shift in the upshift direction while the fourth shift is established so that the second operating member is shifted in the first direction to its neutral position and the third operating member is shifted in the first direction to establish the fifth shift.

2. A vehicle transmission according to claim 1, wherein said skip-shift handling portion is operated prior to or simultaneously with said one-shift handling portion.

3. A vehicle transmission according to claim 1, wherein said skip-shift handling portion is a knob or a switch provided on said one-shift handling mechanism.

* * * * *